United States Patent
Zhu et al.

(10) Patent No.: US 11,299,177 B2
(45) Date of Patent: Apr. 12, 2022

(54) INFORMATION PROCESSING METHOD, ELECTRONIC DEVICE, AND STORAGE MEDIUM

(71) Applicant: Beijing Baidu Netcom Science and Technology Co., Ltd., Beijing (CN)

(72) Inventors: Houqiang Zhu, Beijing (CN); Jia Song, Beijing (CN); Pengfei Wei, Beijing (CN); Bo Zhan, Beijing (CN)

(73) Assignee: Beijing Baidu Netcom Science and Technology Co., Ltd.

( * ) Notice: Subject to any disclaimer, the term of this patent is extended or adjusted under 35 U.S.C. 154(b) by 0 days.

(21) Appl. No.: 17/366,433

(22) Filed: Jul. 2, 2021

(65) Prior Publication Data

US 2021/0331696 A1    Oct. 28, 2021

(30) Foreign Application Priority Data

Dec. 24, 2020   (CN) .......................... 202011550317.4

(51) Int. Cl.
*B60W 60/00*     (2020.01)
*G07C 5/00*      (2006.01)

(52) U.S. Cl.
CPC .......... *B60W 60/001* (2020.02); *G07C 5/008* (2013.01); *B60W 2555/00* (2020.02)

(58) Field of Classification Search
USPC .......................................................... 701/23
See application file for complete search history.

(56) References Cited

U.S. PATENT DOCUMENTS

| | | | |
|---|---|---|---|
| 2015/0244826 A1* | 8/2015 | Stenneth | H04L 67/322 709/213 |
| 2016/0210044 A1* | 7/2016 | Mitkar | G06F 3/0656 |
| 2017/0339224 A1* | 11/2017 | Condeixa | H04W 4/02 |
| 2018/0261020 A1* | 9/2018 | Petousis | G07C 5/0841 |
| 2019/0250827 A1* | 8/2019 | Gutta | G06F 3/065 |
| 2019/0281587 A1* | 9/2019 | Zhang | H04L 5/0053 |

\* cited by examiner

*Primary Examiner* — Tyler D Paige
(74) *Attorney, Agent, or Firm* — Husch Blackwell LLP

(57) ABSTRACT

An information processing method, an electronic device, and a storage medium are provided, which are related to the fields of big data, cloud computing, automatic driving, and the like. The specific implementation includes: receiving a data acquisition task and an acquisition strategy issued by a cloud; analyzing the acquisition strategy to obtain priority information of the acquired data for the data acquisition task; and taking the priority information as an importance degree identifier corresponding to the acquired data, and performing preferential transmission after data acquisition and data screening according to the importance degree identifier.

18 Claims, 6 Drawing Sheets

Create a newest task table

Task Item:

| Sequence Number | Task Selection | Daily Collection Times (1-4) | Time Interval of Acquisition | First Weight Value Setting (1-98) | Second Weight Value Setting (1-98) | Third Weight Value Setting (1-98) | Fourth Weight Value Setting (1-98) | Operation |
|---|---|---|---|---|---|---|---|---|
| 1 | Please select a detailed task in drop-down list ∨ | Selection of Times ∨ | Selection of Duration ∨ | Please fill in a number | Please fill in a number | Please fill in a number | Please fill in a number | |
| 2 | Please select a detailed task in drop-down list ∨ | Selection of Times ∨ | Selection of Duration ∨ | Please fill in a number | Please fill in a number | Please fill in a number | Please fill in a number | |

Add a Row      Delete

[ Create ]   [ Cancel ]

FIG. 2

| Scene Item | Priority | Weight Value (1-100) | Caching Requirements | Backhaul Requirements | Limited by flow or not |
|---|---|---|---|---|---|
| Function Real-time Scheduling Data | High-priority | 100 | No Caching | Real-time Backhaul with Highest-priority | Not limited by average daily flow |
| Function Mapping Data | | | | | |
| Abnormal Backhauling Data | Medium-high-priority | 99 | Non-overwritable | Preferential Real-time Backhaul Caching and then Preferential Backhaul | Limited by flow |
| Multi-task Fusion Data | | | | | |
| High-value Strategy Data | Medium-priority | 60-98 | Overwritable | Preferential Real-time Backhaul Caching and then Preferential Backhaul | Limited by flow |
| General Strategy Data | Low-priority | 1-50 | Overwritable | Caching and then Backhaul Not Occupying Real-time Space | Limited by flow |

FIG. 3

INFORMATION PROCESSING METHOD, ELECTRONIC DEVICE, AND STORAGE MEDIUM

CROSS-REFERENCE TO RELATED APPLICATIONS

This application claims priority to Chinese patent application, No. 202011550317.4, entitled "Information Processing Method, Apparatus, Electronic Device, And Storage Medium", filed with the Chinese Patent Office on Dec. 24, 2020, which is hereby incorporated by reference in its entirety.

TECHNICAL FIELD

The present disclosure relates to the technical field of computers. The present disclosure particularly relates to the fields of big data, cloud computing, automatic driving, and the like.

BACKGROUND

With the development of the big data age, the speed of data acquisition and the quality of data acquisition determine the processing efficiency of each data application scene. Taking automatic driving as an example, currently, the data acquisition of required scene data is mostly carried out through a professional acquisition vehicle going out for performing on-the-spot acquisition, and the data is exported in real time after a specified acquisition task is completed. Alternatively, a third party is entrusted to carry out outsourcing acquisition, or the crowdsourcing acquisition is directly carried out by the masses.

SUMMARY

The present disclosure provides an information processing method, apparatus, electronic device, and a storage medium.

According to one aspect of the present disclosure, there is provided an information processing method including:

receiving a data acquisition task and an acquisition strategy issued by a cloud;

analyzing the acquisition strategy, to obtain priority information of acquired data for the data acquisition task; and taking the priority information as an importance degree identifier corresponding to the acquired data, and performing preferential transmission after data acquisition and data screening according to the importance degree identifier.

According to another aspect of the present disclosure, there is provided an information processing apparatus including:

a receiving module configured for receiving a data acquisition task and an acquisition strategy issued by a cloud;

an analysis module configured for analyzing the acquisition strategy, to obtain priority information of acquired data for the data acquisition task; and a preferential transmission module configured for taking the priority information as an importance degree identifier corresponding to the acquired data, and performing preferential transmission after data acquisition and data screening according to the importance degree identifier.

According to another aspect of the present disclosure, there is provided an electronic device including:

at least one processor; and a memory communicatively connected to the at least one processor; wherein, the memory stores instructions executable by the at least one processor, and the instructions are executed by the at least one processor to enable the at least one processor to perform the method provided by any of the embodiments of the present disclosure.

According to another aspect of the present disclosure, there is provided a non-transitory computer-readable storage medium storing computer instructions, wherein the computer instructions are configured to cause a computer to perform the method provided by any of the embodiments of the present disclosure.

According to another aspect of the present disclosure, a computer program product is provided, including computer instructions, wherein the computer instructions, when executed by a processor, implement the method provided by any embodiment of the present disclosure.

It is to be understood that the contents described in this section is not intended to identify the key or important features of the embodiments of the present disclosure, nor is it intended to limit the scope of the present disclosure. Other features of the present disclosure will be easily understood through the following description.

BRIEF DESCRIPTION OF THE DRAWINGS

The accompanying drawings are included to provide a better understanding of the present technical solution and are not intended to limit the present disclosure, in which:

FIG. 2 is a schematic diagram showing configuration of data weights according to an embodiment of the present disclosure;

FIG. 3 is a schematic diagram showing caching, backhauling, and flow limiting configurations based on priority information according to an embodiment of the present disclosure;

DETAILED DESCRIPTION

Figure 1:
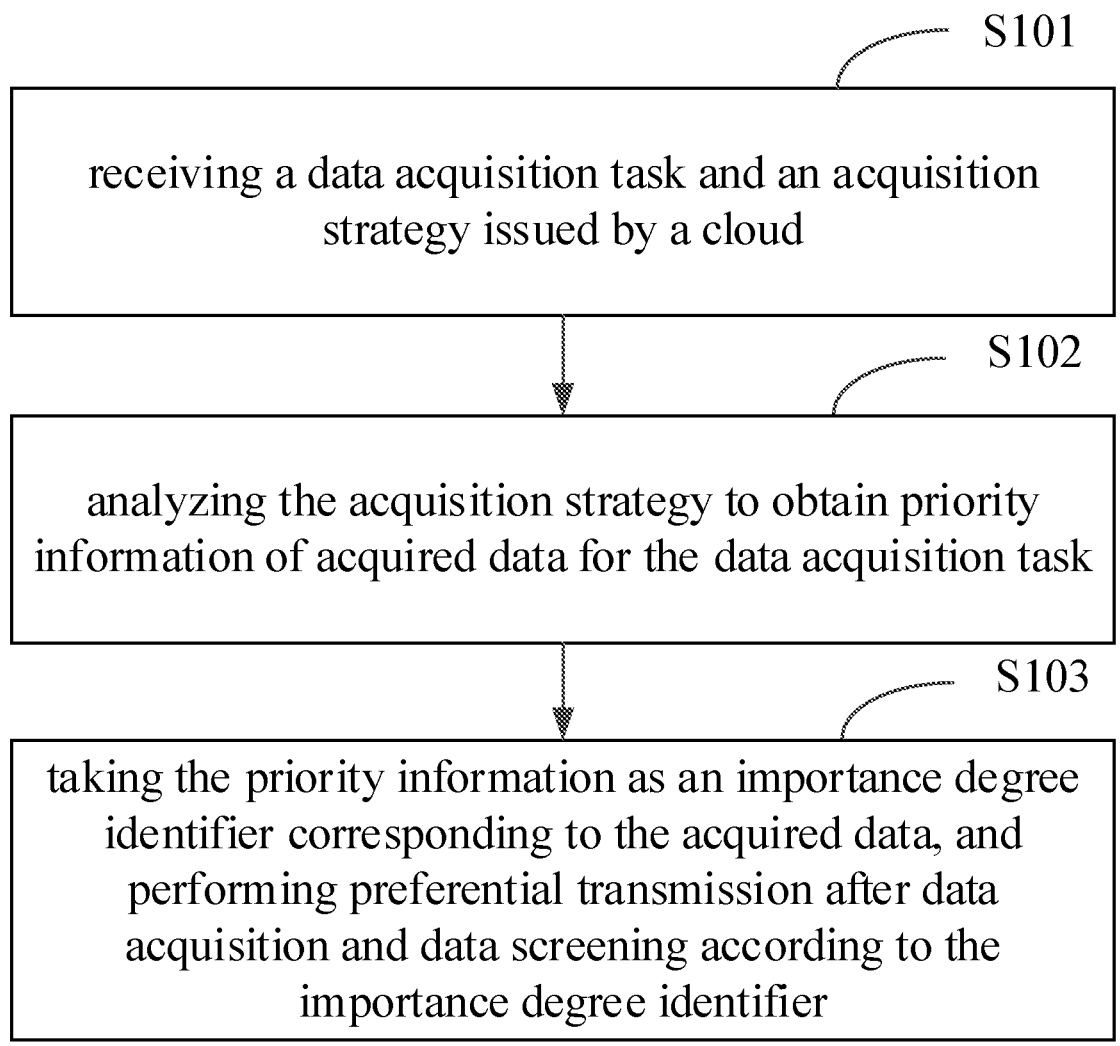
FIG. 1 is a flow diagram showing an information processing method according to an embodiment of the present disclosure.

The following describes exemplary embodiments of the present disclosure with reference to the accompanying drawings, which include various details of the embodiments of the present disclosure to facilitate understanding and should be considered as merely exemplary. Accordingly, one of ordinary skills in the art appreciates that various changes and modifications can be made to the embodiments described herein without departing from the scope and spirit of the present disclosure. Also, descriptions of well-known functions and structures are omitted from the following description for clarity and conciseness.

The term "and/or", as used herein, is merely used to describe a relationship between associated objects, meaning that there may be three relationships, e.g., A and/or B may represent three cases of only A, both A and B, and only B.

As used herein, the term "at least one" means any one of a variety of elements or any combination of at least two of a variety of elements, e.g., including at least one of A, B, and C may represent including any one or more elements selected from the group consisting of A, B, and C. The terms "first" and "second" are used herein to refer to and distinguish between a plurality of similar technical terms, and are not intended to limit the order or to define that the number is only two, e.g., a first feature and a second feature are referred to two categories of/two features, wherein the first feature may be one or more, and the second feature may also be one or more.

Further, in the following preferred embodiments, numerous specific details are set forth in order to provide a better understanding of the present disclosure. It will be understood by those skilled in the art that the present disclosure may also be practiced without some of the specific details. In some instances, methods, means, elements, and circuits well known to those skilled in the art have not been described in detail so as to highlight the subject matter of the present disclosure.

In the process of data acquisition, taking automatic driving as an example, based on research and development requirements, data acquisition needs to be carried out at the vehicle end to obtain scene data required by automatic driving, which is a necessary operation for the development and iteration of the automatic driving technology. However, after all sensors are turned on, the amount of data of continuous frames recorded is large, which requires not only an equipment with large storage space at the vehicle end for writing and storing data, but also the stability and safety in copying and transmission processes. Meanwhile, redundant acquired data also brings great workload and time cost for manual data retrieval, cleaning, and use. Therefore, the function of data acquisition should be as follows: the limited space and manpower is used for processing high-value data (that is: data acquisition pursues precision and data matching) rather than general collection for similar and repeated data. In particular, for the mass production vehicles sold to consumers, the data collected by a data automatic acquisition system of the vehicle end such as shadow mode, data closed loop, and the like, must be directly uploaded to an enterprise data cloud through a network link, which is different from the data collected by using a vehicle end disk box, that can be manually brought back for transmission by an engineer. A large amount of driving scene data is accumulated in the running process of tens of thousands of mass production vehicles, and screening, filtering and preferential backhauling are required to be completed at respective user vehicle ends, so that the acquisition efficiency of non-professional manners performed by the masses is improved and the flow consumption in the transmission process is reduced.

In order to avoid compromising the performance of the vehicle end, reduce the cost and ensure that the high-value data can be transmitted as much as possible in a case that a network link is available but limited, and the like, various acquisition modes as follows can be adopted.

At present, the scene data required by automatic driving is mostly acquired through a professional acquisition vehicle going out for performing an on-the-spot acquisition. The acquisition vehicle is usually provided with a data storage equipment with large capacity. After the vehicle completes a designated acquisition task, a researcher carries out manual real-time data export through a notebook computer at the vehicle end or drives the vehicle back to a research and development place to export the data for use. In a case that a long distance or a large number of acquisition tasks is faced, as it is not convenient to export data in time, one or more external mobile hard disks with ultra-large capacity (such as a data disk box mainly consisting of a mobile hard disk) can also be mounted on the vehicle end so that the vehicle can go out for long-time continuous data acquisition. After all tasks are completed, all the hard disks are brought back on board, or the mobile hard disks are mailed back in the process and are used for emergency research and development. It can be seen that: whether data is exported manually in real time or a vehicle is driven back and data is exported, a large amount of time is inevitably consumed in the transmission process, data acquisition is interrupted, and various real-time acquisition tasks cannot be implemented. In addition, providing an external mobile hard disk on the vehicle end only optimizes the flexibility of storage capacity in the data acquisition process, but the problem of low efficiency due to the fact that the data needs to be copied and manually exported is not fundamentally solved, and the data acquisition mode in a low efficiency state leads to low transmission efficiency.

Except for a data acquisition mode of a professional acquisition vehicle going out for performing on-the-spot acquisition, an acquisition mode of outsourcing acquisition or crowdsourcing acquisition can also be adopted. For outsourcing acquisition, part of research and development institutions can carry out outsourcing acquisition in combination with a third-party company, and part of data acquisition equipment provided by the research and development institutions has networking and data uploading capabilities, so that the transmission to the cloud can be completed directly in the equipment after the data is acquired. For crowdsourcing acquisition, direct crowdsourcing acquisition can be directly carried out for mass users. In a crowdsourcing acquisition mode, data acquisition can be carried out by crowdsourcing personnel using a camera, a sensor, or a private acquisition device, and other equipment installed, and local acquired data is actively uploaded in a preset crowdsourcing required manner.

In summary, however, no matter whether the data acquisition mode of the professional acquisition vehicle going out for performing on-the-spot acquisition, the acquisition mode of the outsourcing acquisition, or the crowdsourcing acquisition is adopted, the data transmission modes are mostly implemented by manual operation and most of the transmission processes are the total transmission (i.e. total copy), in a manner of performing transmission immediately after acquiring data, after the data acquisition is triggered, without screening the contents acquired. The data finally being written and stored depends on cleaning and filtering operations performed by research and development personnel through investing special manpower, to select high-value data meeting the research and development needs for use, so that a large amount of labor cost is occupied. Even if a vehicle with the network transmission capability is used for data uploading in the outsourcing acquisition mode, and the data uploading is performed based on the nature of the crowdsourcing in the crowdsourcing acquisition mode, the process of copying by manpower can be omitted, the content quality of the transmitted data is not controlled, and after massive acquired data is transmitted to the cloud, a large amount of energy needs to be consumed by users for searching and screening the available data. In particular, in a case that the technology enters an iteration stage of a long tail stage, high-value data is gradually reduced and the selection of data that can practically be applied to algorithm optimization is very difficult. The valuable data is established at the vehicle end and can be applied to technical research and development, but is limited by defects in the process, so that the algorithm that should be quickly iterated originally and the project progress are delayed, causing that tasks related to automatic driving cannot be iterated and updated rapidly. The data acquisition manner in a long-term inefficient state is a challenge for various automatic driving technology research and development institutions.

According to the present disclosure, taking an automatic driving scene as an example, it can be applicable to an automatic driving vehicle with the above scene data self-acquisition capability. The priority information configured by the cloud is used as an importance degree identifier corresponding to acquired data, and preferential transmission after data acquisition and data screening is executed according to the importance degree identifier. The preferential transmission (such as preferential overlay storage, transmission, and the like) of the locally acquired data of the vehicle end after data screening is realized. The data item with the highest value to the research and development personnel can be automatically selected within the limited flow range of the original equipment manufacturer, and contents with the highest value are backhauled after sufficient screening is carried out. Due to the fact that the high-value data can be automatically and preferentially selected and uploaded, the problem that the data acquisition mode is in the low-efficiency state and thus the transmission efficiency is low is solved, so that not only the labor cost is reduced, but the acquisition efficiency is improved, especially that the preferentially transmission, instead of total transmission, for the high-value data after performing data screening can also reduce the flow consumption in the data set transmission process.

According to an embodiment of the present disclosure, an information processing method is provided. FIG. 1 is a flow diagram showing an information processing method according to an embodiment of the present disclosure. The method can be applicable to an information processing apparatus, for example, the device can be deployed to a terminal (vehicle end: such as an automatic driving vehicle having data self-acquisition capability) or a server or other processing equipment to perform data analyzing, data acquisition, data screening, preferential transmission, and the like. Among other things, the terminal may be user equipment (UE), mobile equipment, a cellular phone, a cordless phone, a personal digital assistant (PDA), handheld equipment, computing equipment, vehicle-mounted equipment, wearable equipment, etc. In some possible implementations, the method may also be implemented by processor calling computer-readable instructions stored in a memory. As shown in FIG. 1, the following steps are included.

S101, receiving a data acquisition task and an acquisition strategy issued by a cloud.

S102, analyzing the acquisition strategy to obtain priority information of acquired data for the data acquisition task.

S103, taking the priority information as an importance degree identifier corresponding to the acquired data, and performing preferential transmission after data acquisition and data screening according to the importance degree identifier.

According to an example of the above-mentioned S101-S103, data acquisition is carried out by a vehicle (e.g., a vehicle supporting automatic driving) based on a scene data self-acquisition capability of the vehicle itself, and data screening is carried out on the locally acquired data at the vehicle end and the preferential transmission is performed. The data screening is a set of automatic data value evaluation operation logic without manual intervention, and therefore labor cost is saved. In particular, it may include following steps: 1) an acquisition strategy is configured in advance at a cloud and is issued to a vehicle end in a form of task instruction, and the vehicle receives a data acquisition task and the acquisition strategy issued by the cloud; 2) the vehicle analyzes the acquisition strategy to obtain priority information for the data acquisition task, for example, the priority information can be obtained according to the weight setting of each data acquisition strategy, the daily acquisition times, the interval duration between multiple times of acquisition, the weights for different acquisition times per day and the like; and 3) the vehicle takes the priority information (such as high-priority, medium-high-priority, medium-priority, low-priority and the like) as an importance degree identifier corresponding to the acquired data in the data acquisition task, and performs preferential transmission after data acquisition and data screening according to the importance degree identifier, for example, transmission and caching forms can be formulated according to the importance degree of the acquired data, a data overwriting strategy is further determined based on constraint conditions, and finally, preferential transmission is performed on the data content meeting the transmission condition and the data content is transmitted to the cloud.

By adopting the present disclosure, a vehicle receives a data acquisition task and an acquisition strategy issued by a cloud, analyzes the acquisition strategy to obtain priority information for acquired data in the data acquisition task, and can take the priority information as an importance degree identifier corresponding to the acquired data to perform preferential transmission after data acquisition and data screening according to the importance degree identifier. The preferential transmission is carried out after screening the locally acquired data of the vehicle, which can automatically select high-value data, so that labor cost is reduced. Through sufficient screening, high-value data is obtained for transmission instead of total transmission, so that the acquisition efficiency is improved, and the flow consumption in the data set transmission process can also be reduced.

In one implementation, priority information may be obtained from data weights configured for acquired data. The method further includes: assigning values to the acquired data with different data weights respectively to obtain the priority information describing different importance degrees. By adopting the present implementation, through data weight configuration and priority setting, after data acquisition is triggered, different priority information can be obtained according to the data weight configured in advance by the cloud previously for different acquired data. Since the priority information describes the importance degree of the acquired data, a precondition can be provided for subsequent preferential transmission after data screening.

In one implementation, taking the priority information as the importance degree identifier corresponding to the acquired data, and performing the preferential transmission after data acquisition and data screening according to the importance degree identifier includes: in a case that the priority information is a first priority (such as high priority), a data acquisition operation is triggered, and the acquired data is transmitted to the cloud in real time; in a case that the priority information is a non-first priority (such as non-high priority, that is: medium-high priority, medium priority, low priority and the like), the data acquisition operation is triggered, and data screening is performed on the acquired data through at least one of caching configuration, storage overwriting configuration and caching data uploading configuration, and screened data is transmitted to the cloud. By adopting the present implementation, data screening is carried out according to different priority information. For the case of first priority, as the importance degree of the acquired data is the highest, the vehicle needs to directly transmit the acquired data to the cloud in real time. For the case of non-first priority, as the importance degree of the acquired data is medium-high, medium, low or the like, the vehicle does not need to transmit the acquired data to the cloud in real time, but needs to carry out data screening decision according to at least one of caching configuration, storage overwriting configuration and caching data uploading configuration, and transmits the data to the cloud. Through data screening based on different priority information, not only can the timeliness of transmission of important data be guaranteed, but also other non-important data can be guaranteed to be preferentially transmitted according to different importance degrees and matching requirements with the above-mentioned configurations, so that the acquisition efficiency is improved.

It should be pointed out that for other non-important data, data screening decision can be performed according to at least one of the caching configuration, storage overwriting configuration and caching data uploading configuration, and the data is transmitted to the cloud. In the following description, in order to simplify the description, the first data is used as the data acquired after triggering the data acquisition operation, and the second data is used as the newly acquired data.

1. According to a first situation, triggering the data acquisition operation, performing the data screening on the acquired data through at least one of caching configuration, storage overwriting configuration and cached data uploading configuration, and transmitting the screened data to the cloud, in a case that the priority information is the non-first priority, includes: triggering the data acquisition operation, caching first data locally, writing the first data into a local data storage area, and transmitting the first data to the cloud if a network condition is met, in a case that the priority information is a second priority. The first data is stored in the local data storage area and cannot be overwritten by a second data before transmitted.

2. According to a second situation, triggering the data acquisition operation, performing the data screening on the acquired data through at least one of caching configuration, storage overwriting configuration and cached data uploading configuration, and transmitting the screened data to the cloud, in a case that the priority information is the non-first priority, includes: triggering the data acquisition operation, caching first data locally, writing the first data into a local data storage area, and transmitting the first data to the cloud if a network condition is met, in a case that the priority information is a third priority. The first data can be overwritten by a second data during a time period after being written into the local data storage area and before transmitted, and a data weight of the second data is greater than a data weight configured for the first data.

3. According to a third situation, triggering the data acquisition operation, performing the data screening on the acquired data through at least one of caching configuration, storage overwriting configuration and cached data uploading configuration, and transmitting the screened data to the cloud, in a case that the priority information is the non-first priority, includes: triggering the data acquisition operation, caching first data locally, writing the first data into a local data storage area, and transmitting the first data to the cloud until a transmission of second data is completed, in a case that the priority information is a fourth priority. The data weight of the second data is greater than the data weight configured for the first data.

By adopting the above various implementations, data screening can be further realized for other non-important data, so that preferential transmission is carried out according to different importance degrees and various matching requirements (the data screening operation is determined after matching at least one of the caching configuration, storage overwriting configuration and caching data uploading configuration) configured, and the acquisition efficiency is improved.

In an implementation, in case that acquired data in the local data storage area has different data weights, the following step is further included: triggering an operation of writing newly acquired data into the local data storage area. In response to the operation of writing into the local data storage area, the existing acquired data can be preferably overwritten according to the data weight and time, which includes following contents.

1. In a case that data weights of a plurality of pieces of acquired data existing in the local data storage area are all smaller than a data weight of the newly acquired data, data with the lowest data weight in the plurality of pieces of acquired data, or data with the largest time difference value is preferentially overwritten, wherein the time difference value indicates a time difference between a moment when data is acquired and a current moment. For example, one situation is that: the weight values of the plurality of pieces of existing acquired data are different, the data with the lowest weight value is preferentially overwritten; another situation is that: the weight values of the plurality of pieces of existing acquired data are the same, the data with the largest time difference value is preferentially overwritten.

2. In a case that data weights of the plurality of pieces of acquired data existing in the local data storage area are greater than or equal to the data weight of the newly acquired data, data with the largest time difference value in the plurality of pieces of existing acquired data is preferentially overwritten, wherein the time difference value indicates a time difference between a moment when data is acquired and a current moment.

3. In a case that data weights of a plurality of pieces of acquired data existing in the local data storage area are all greater than the data weight of the newly acquired data, the newly acquired data is discarded. That is: after the operation of writing the newly acquired data into the local data storage area is triggered, the newly acquired data is not written into the local data storage area, but is directly discarded.

By adopting the present implementation, in a case that newly acquired data needs to be written into the local data storage area upon the newly acquired data is obtained, the data weight of the newly acquired data needs to be compared with the data weight of the existing acquired data in the local data storage area, and the preferred overwriting is realized by comparison according to the above three modes, so that the data with higher data weight and the time of which is closer to the current time is preferentially transmitted, thereby ensuring transmission requirements of transmitting more important data and higher timeliness.

Examples of Applications

A processing flow according to an embodiment of the present disclosure includes following contents.

By applying the data acquisition mode of preferential transmission of the present disclosure to an automatic driving vehicle, the preferential transmission of the self-acquired data of the vehicle can be realized. The mechanism for preferentially transmitting the self-acquired data of the vehicle includes: formulating a transmission and cache form according to the importance degree of the acquired data, further determining a preferential overwriting strategy of the acquired data based on constraint conditions (such as network flow limiting, cache capacity and the like), and finally carrying out uploading operation on high-value data content meeting the transmission conditions. Specifically, the following contents are included.

1. Data Weight Configuration

The strategy for a vehicle to perform data acquisition is usually configured in advance at the cloud and issued to the vehicle end in the form of task instruction. The weight setting for each data acquisition strategy is added in this step to serve as the weight of the data package of the scene data acquired by the vehicle itself according to the corresponding strategy in the running process.

Furthermore, for each strategy, the daily acquisition times and the interval duration between multiple times of acquisition can be further set, and the weights of different acquisition times per day are set differently according to the data application requirements so that the preferential transmission and writing and storage of high-value data is guaranteed under limited acquisition capability.

FIG. 2 is a schematic diagram showing data weight configuration according to an embodiment of the present disclosure. As shown in FIG. 2, the data weight can be an integer within the range of [1, 100]. The weight range is manually set to [1, n], (n<100), and the granularity can meet the priority differentiating requirement of most data acquisition tasks of a vehicle end. The weight value in the range of (n, 100] is reserved for a default highest-priority data acquisition task, that is, the importance degree of a conventional acquisition task configured according to the research and development of high-priority requirement is by default higher than the importance degree of other manually configured tasks. The numerical value of n can be flexibly adjusted according to the degree of the high-priority requirement, and tasks corresponding to respective weights in the range of (n, 100] are systematically configured in advance. In one example of FIG. 2, n=98, i.e., two weight values of 99, 100 are reserved and configured for two types of high-priority acquisition strategies, with weights of 98 and below available for manual configuration.

2. Data Priority Rule

For acquired data with different data weights, different priority information describing different importance degrees can be assigned, and subsequent rules of caching, backhauling, flow limiting, and the like are configured according to the priority information.

The priority information corresponding to data with a data weight of 100 is high-priority. This type of data usually comes from the main business requirement or core requirement of research and development, and the importance degree is "highest". After the high-priority data is acquired by the vehicle end, the high-priority data is backhauled to the cloud in real time by default with the highest priority, not cached at the vehicle end, and not limited by the flow constraint of data transmission applied from the original equipment manufacturer to mass production vehicles. Transmission is carried out after the acquisition is triggered, so that the writing and storage of this type of high-value data at the cloud can be ensured to be completed to the greatest extent.

The corresponding priority of the data with the data weight in the range of (n, 100] is: medium-high priority. This type of data is of high importance degree and has obvious value for research and development, but it is not the data that must be necessarily transmitted. After the vehicle end acquires this type of data, the data is preferentially uploaded to the cloud in real time. But if the network status is not good, the data can be cached at the vehicle end, and uploaded immediately if a network condition is met. After being written into the cache, this type of data cannot be overwritten by subsequent newly acquired data and needs to be kept until being uploaded. This type of data is not necessary for business and is limited by the data transmission flow of the mass production vehicle. If the data uploaded by the vehicle end reaches a limit value, the data is not allowed to be uploaded, the cached data is erased, and data acquisition is stopped being triggered within the limited range.

The corresponding priority of the data with a data weight in the range of [60, n] is: medium-priority. This type of data is of general importance degree but high-value, mainly the data content that desired to be collected and supplemented through the mass production vehicle in terms of algorithm research and development. After this type of data is acquired by the vehicle end, the data is also preferentially uploaded to the cloud in real time. But in case that the network status is poor, the data can be cached at the vehicle end, and uploaded immediately if a network condition is met. However, after being written into the cache and before being uploaded, this type of data can be overwritten by subsequent newly acquired data with higher weight. At the transmission node, the vehicle end only uploads the latest data item after overwriting. The transmission of this type of data is also limited by the flow and the data is uploaded only within the flow constraint range.

The corresponding priority of the data with a data weight in the range of [1, 60) is: low-priority. This type of data is of low importance degree, and is scene data required by non-core research and development requirements, and is acquired if a condition is met. In order not to compete for transmission and flow resources with other important tasks, the vehicle end caches this type of data locally by default after acquiring so that real-time transmission space is not occupied. After this type of data is written into the cache and before the data is uploaded, the data waits for other high-weight data to be preferentially cached (and possibly overwriting other data) and transmitted within the flow constraint quota. If no other acquired high-weight data occupies the flow quota until the final uploading request time point is reached, this type of data is uploaded.

FIG. 3 is a schematic diagram showing caching, backhauling, and flow limiting configurations based on priority information according to an embodiment of the present disclosure. In an example shown in FIG. 3, high-priority data with a weight of 100 is data closely related to an automatic driving business and is generated only when the network status is good. The high-priority data, as functional necessary data, must meet real-time transmission requirements and therefore is transmitted in real time as the highest-priority data without subjecting to flow limit. Abnormal backhauling data and multi-task fusion data are of high importance degree and high value in data research and development, and thus used as medium-high-priority data with the weight of 99 by default. The various types of strategy data with weight values of 98 and below are correspondingly cached, overwritten and transmitted according to the priority rule.

3. Caching Configuration (i.e. Caching Mechanism Design)

Except for the data uploaded in real time according to the first priority, as for the data cached at the vehicle end, secondary screening on data importance degree is performed by the vehicle end, and the cached data is filtered again and thus preferentially uploaded.

In a case that data acquisition corresponding to one strategy task is triggered and completed once, and after the data package is compressed and encrypted as a whole, and if data cannot be backhauled in real time since the network condition is not met, or if the priority is low so that the data needs to be screened by comparing with other data according to the weight subsequently, the data is written into an embedded multimedia controller (eMMC), the eMMC is used as a local data storage area for caching data, and power failure protection is performed on the eMMC so as to reserve the data which needs to be subsequently uploaded after the power is on in next day.

The caching of the data depends on the memory space, and the system should monitor the status of the memory space in real time and take appropriate strategies: 1) if the memory is damaged, stopping acquiring and storing; 2) limiting flow: strictly limiting the flow by taking a week as a unit, wherein the daily flow is permitted to rise up to 50% on the basis of average daily limit; and 3) if the acquired data volume exceeds the stipulated flow, performing data overwriting according to a preferential overwriting rule.

4. Storage Overwriting Configuration (i.e., Storage Overwriting Principle)

Figure 4:
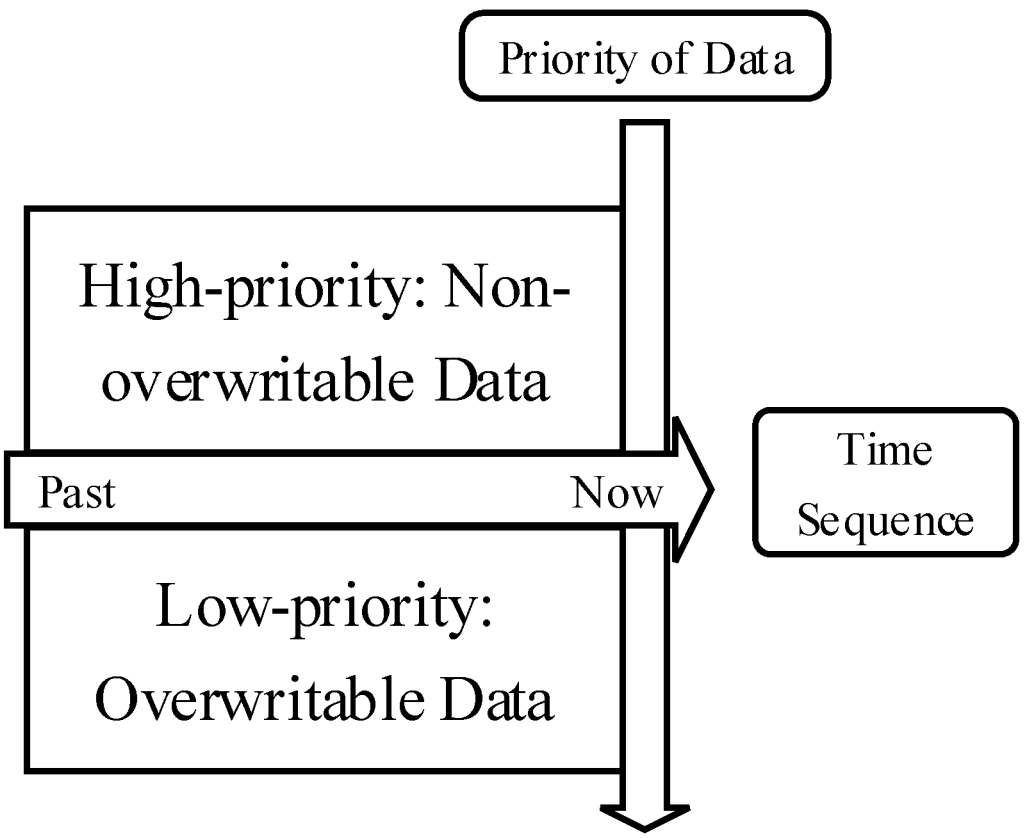
FIG. 4 is a schematic diagram showing a storage overwriting configuration according to an embodiment of the present disclosure.

FIG. 4 is a schematic diagram showing a storage overwriting configuration according to an embodiment of the present disclosure. As shown in FIG. 4, for the data that has been cached in the eMMC, data overwriting operation is carried out based on storage priority according to a preset overwriting principle. The storage priority setting involves two dimensions: data priority+time sequence. The data priority is normalized on the data weight value, and can be configured in the process of performing the data weight configuration, and the correspondence configuration between the data weight and the priority is carried out according to the data priority rule. The time sequence is measured by the absolute time of triggering data acquisition.

If the storage space of eMMC is full and data with different weight values exists, the acquired data is overwritten according to the preferential overwriting principle as follows.

1) The data weight value of the newest generated data (i.e. the newly acquired data) is recorded as X, and in a case that the eMMC has data with a lower weight value than X, the data with the lowest weight value is overwritten preferentially, and if a plurality of pieces of data with the lowest weight value exist at the same time, the one piece of data with the largest time difference value is overwritten.

2) The data weight value of the newest generated data (i.e. the newly acquired data) is recorded as X, and if the data weight values in the eMMC are greater than or equal to X, the data with weight value of X and with the largest time difference value is preferentially overwritten.

3) The data weight value of the newest generated data (i.e. the newly acquired data) is recorded as X, and if the data weight values in the eMMC are all greater than X, this newly acquired data is not written into the storage area and is discarded.

5. Uploading of Cached Data

Data backhaul is triggered if data uploading is allowed under the network condition and the accumulated data transmission amount of the current month is within the flow range defined by the original equipment manufacturer. Specifically, there are following two situations.

1) data uploading is triggered if the data storage area has medium-high priority data and higher priority data which are not backhauled. The backhauling sequence is that the data with higher priority is preferentially transmitted, and the transmission sequence of the data with the same priority is from the nearest time to the farthest time.

2) For the low-priority cached data with a weight value of 1-50, the uploading mechanism is as follows.

① The cached data is not backhauled on the current day, and waits for being overwritten by the newly cached data according to the overwriting principle.

② If the real-time backhauling data reaches the 50% rising limit of the daily flow, the cached data is erased, and no backhauling is performed.

③ The data cached on the current day is backhauled uniformly after the vehicle is powered on for the first time on the next day.

a) If the network status is poor or other real-time backhauling tasks exist after the vehicle is powered on for the first time on the next day, the data cached on the previous day waits for backhaul in case that the network condition is met or in case that other real-time backhauling tasks finish. During the waiting period, the newly generated cached data does not overwrite the data of the previous day, and is regarded as the new day's cached data.

b) If the vehicle is still in a running state at 24 o'clock in the evening, the cached data of the previous day is immediately backhauled after 24 o'clock. If the network status is poor or other real-time backhauling tasks exist at that moment, the cached data of the previous day is backhauled in case that the network condition is met or other real-time backhauling tasks finish. During the waiting period, the newly generated cached data does not overwrite the data of the previous day.

④ If the cached data cannot be uploaded continuously due to continuous poor network status and the like:

c) if the total amount of the cached data reaches the upper limit of the weekly flow or the storage space is full, the medium-priority and low-priority cached data with the largest time difference value is preferentially overwritten according to the sequence from the farthest time to the nearest time; and d) if the storage space is full and filled with the medium-high-priority data that cannot be overwritten, the data is allowed to be overwritten by the newly acquired medium-high-priority data from the farthest data in time sequence.

According to the application example, the above five parts are adopted. Based on the whole set of automatic data value evaluation and operation processes of weight configuration, priority rule formulation, cache mechanism design, storage overwriting principle setting and cached data uploading mechanism, the acquired data of mass production vehicles is screened according to the importance degree, so that preferential overwriting storage and uploading of vehicle self-acquired data after data screening are realized. The preferential uploading of the high-value data that has maximum benefit is achieved within the established capital and time constraint range. The manual operation investment is saved, the transmission and cleaning cost of the low value data is saved, and the high-value data with the time dimension and the data weight dimension closest to the current time, the highest precision, the highest efficiency and the largest breadth is directly presented for research and development personnel. The input for training automatic driving algorithm is strengthened from the source so as to accelerate the model iteration efficiency. The automatic data value evaluation and operation process is applied to an automatic driving mass production vehicle, the screening and filtering of complex acquired data can be quickly realized, and the processing efficiency of the data acquisition is improved.

Figure 5:
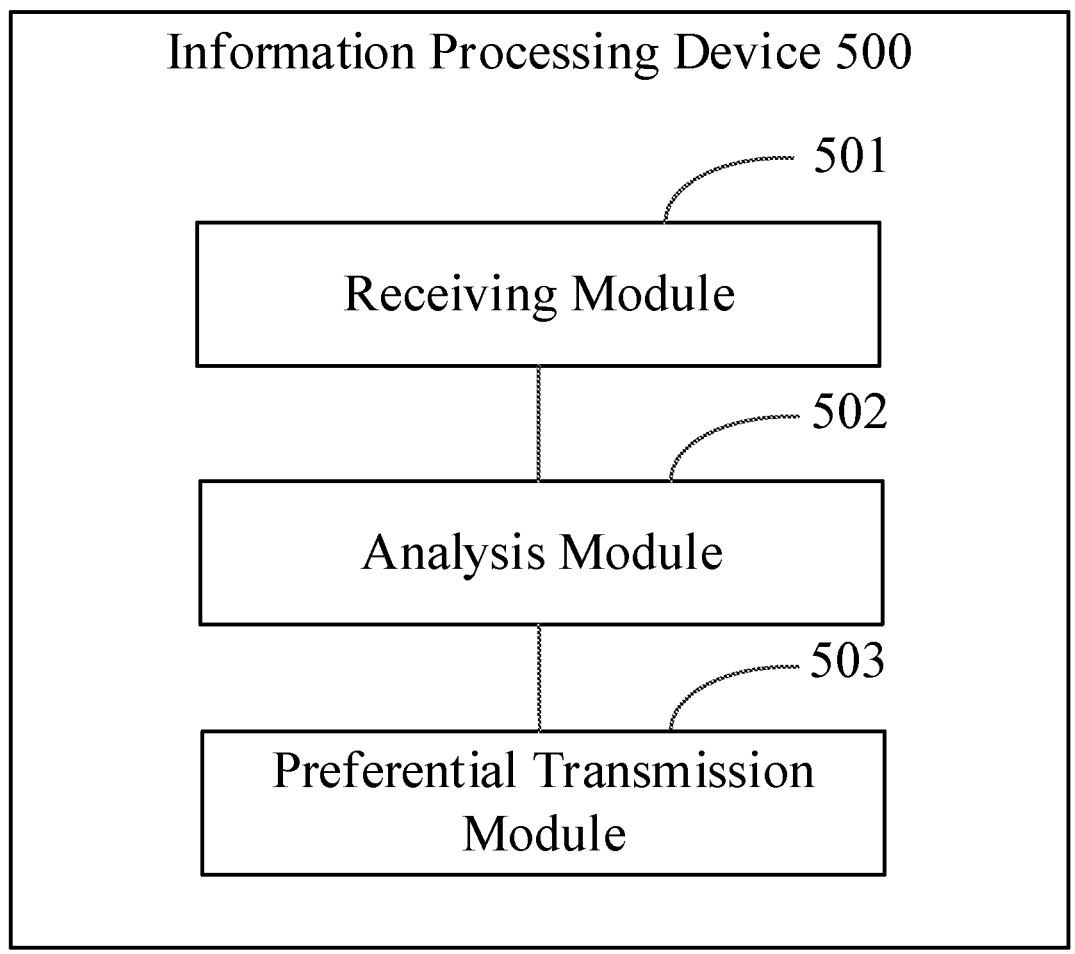
FIG. 5 is a schematic structural diagram showing an information processing apparatus according to an embodiment of the present disclosure.

An information processing apparatus is provided according to an embodiment of the present disclosure. FIG. 5 is a schematic structural diagram showing an information processing apparatus according to an embodiment of the present disclosure. As shown in FIG. 5, the information processing apparatus 500 includes: a receiving module 501 configured for receiving a data acquisition task and an acquisition strategy issued by a cloud; an analysis module 502 configured for analyzing the acquisition strategy, to obtain priority information of acquired data for the data acquisition task; and a preferential transmission module 503 configured for taking the priority information as an importance degree identifier corresponding to the acquired data, and performing preferential transmission after data acquisition and data screening according to the importance degree identifier.

In an implementation, the priority information is obtained according to a data weight configured for the acquired data. The apparatus further includes a value assignment module configured for assigning values to the acquired data with different data weights respectively to obtain the priority information describing different importance degrees.

In an implementation, the preferential transmission module includes: a first processing sub-module configured for triggering a data acquisition operation and transmitting the acquired data to the cloud in real time, in a case that the priority information is a first priority; and a second processing sub-module configured for triggering the data acquisition operation, performing data screening on the acquired data through at least one of caching configuration, storage overwriting configuration, and cached data uploading configuration, and transmitting screened data to the cloud, in a case that the priority information is a non-first priority.

In an implementation, the second processing sub-module is configured for triggering the data acquisition operation, caching first data locally, writing the first data into a local data storage area, and transmitting the first data to the cloud if a network condition is met, in a case that the priority information is a second priority; wherein the first data is stored in the local data storage area and cannot be overwritten by a second data before transmitted.

In an implementation, the second processing sub-module is configured for triggering the data acquisition operation, caching first data locally, writing the first data into a local data storage area, and transmitting the first data to the cloud if a network condition is met, in a case that the priority information is a third priority; wherein the first data can be overwritten by a second data during a time period after being written into the local data storage area and before transmitted, and a data weight of the second data is greater than a data weight configured for the first data.

In an implementation, the second processing sub-module is configured for triggering the data acquisition operation, caching first data locally, writing the first data into a local data storage area, and transmitting the first data to the cloud until a transmission of second data is completed, in a case that the priority information is a fourth priority; wherein a data weight of the second data is greater than a data weight configured for the first data.

In an implementation, in a case that the acquired data in the local data storage area has different data weights, an overwriting decision module is included for triggering an operation of writing newly acquired data into the local data storage area; overwriting, preferentially, data with a lowest data weight in a plurality of pieces of acquired data, or overwriting, preferentially, data with a largest time difference value in a plurality of pieces of acquired data, wherein the time difference value indicates a time difference between a moment when data is acquired and a current moment, in a case that data weights of the plurality of pieces of acquired data existing in the local data storage area are all smaller than a data weight of the newly acquired data; overwriting, preferentially, data with a largest time difference value in a plurality of pieces of acquired data, wherein the time difference value indicates a time difference between a moment when data is acquired and a current moment, in a case that data weights of the plurality of pieces of acquired data existing in the local data storage area are greater than or equal to a data weight of the newly acquired data; or discarding the newly acquired data, in a case that data weights of a plurality of pieces of acquired data existing in the local data storage area are all greater than a data weight of the newly acquired data.

The function of each module in the apparatus of each embodiment of the present disclosure can be referred to the corresponding description in the above-mentioned method, which will not be described in detail herein.

According to an embodiment of the present disclosure, the present disclosure also provides an electronic device and a readable storage medium.

Figure 6:
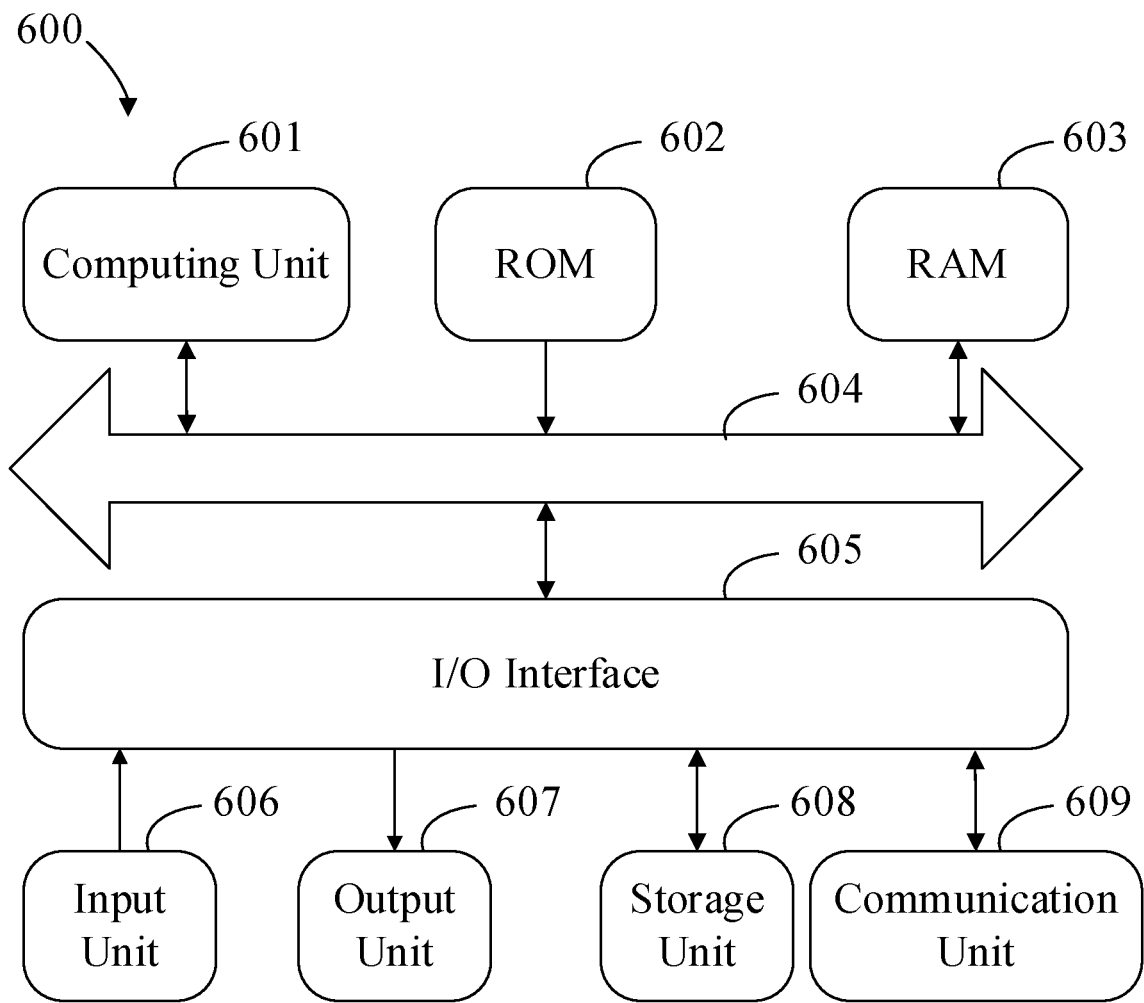
FIG. 6 is a block diagram showing an electronic device for implementing the information processing method according to an embodiment of the present disclosure.

FIG. 6 is a block diagram showing an electronic device for implementing an information processing method according to an embodiment of the present disclosure. The electronic device may be a deployment device or a proxy device. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital processors, cellular telephones, smart phones, wearable equipment, and other similar computing devices. The components, connections and relationships thereof, and functions thereof shown herein are by way of example only and are not intended to limit the implementations of the present disclosure described and/or claimed herein.

As shown in FIG. 6, device 600 includes a computing unit 601 that may perform various suitable actions and processes according to a computer program stored in a read only memory (ROM) 602 or a computer program loaded from a storage unit 608 into a random access memory (RAM) 603. In the RAM 603, various programs and data required by the operation of the device 600 may also be stored. The computing unit 601, the ROM 602 and the RAM 603 are connected to each other via a bus 604. An input and output (I/O) interface 605 is also connected to the bus 604.

Multiple components in the device 600 are connected to the I/O interface 605, including: an input unit 606, such as a keyboard, a mouse, etc.; an output unit 607, such as various types of displays, speakers, etc.; a storage unit 608, such as a magnetic disk, an optical disk, etc.; and a communication unit 609, such as a network card, a modem, a wireless communication transceiver, etc. The communication unit 609 allows the device 600 to exchange information/data with other devices over a computer network, such as the Internet, and/or various telecommunication networks.

The computing unit 601 may be various general purpose and/or special purpose processing assemblies having processing and computing capabilities. Some examples of the computing unit 601 include, but are not limited to, a central processing unit (CPU), a graphic processing unit (GPU), various special purpose artificial intelligence (AI) computing chips, various computing units running a machine learning model algorithm, a digital signal processor (DSP), and any suitable processors, controllers, microcontrollers, etc. The computing unit 601 performs various methods and processes described above, such as an information processing method. For example, in some embodiments, the information processing method may be implemented as a computer software program tangibly included in a machine-readable medium, such as a storage unit 608. In some embodiments, part or all of the computer program may be loaded and/or installed on the device 600 via the ROM 602 and/or the communication unit 609. When a computer program is loaded into the RAM 603 and executed by the computing unit 601, one or more steps of the information processing method described above may be performed. Alternatively, in other embodiments, the computing unit 601 may be configured to perform the information processing method by any other suitable means (e.g., via firmware).

Various implementations of the system and technology described above herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), computer hardware, firmware, software, and/or a combination thereof. These various implementations may include: implementing in one or more computer programs, which can be executed and/or interpreted on a programmable system including at least one programmable processor. The programmable processor may be a dedicated or general-purpose programmable processor, which can receive data and instructions from, and transmit the data and instructions to, a memory system, at least one input device, and at least one output device.

Program code for implementing the method of the present disclosure may be edited in any combination of one or more programming languages. These program codes may be provided to a processor or controller of a general purpose computer, special purpose computer, or other programmable data processing device such that the program codes, when executed by the processor or controller, cause the functions/operations shown in the flow diagram and/or block diagram to be implemented. The program code may be executed entirely on a machine, partly on a machine, or as an independent software package partly on a machine and partly on a remote machine or entirely on a remote machine or server.

In the context of the present disclosure, a machine-readable medium may be a tangible medium that may include or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of a machine-readable storage medium may include an electrical connection based on one or more wires, a portable computer disk, a hard disk, a random access memory (RAM), a read-only memory (ROM), an erasable programmable read-only memory (EPROM or Flash Memory), an optical fiber, a portable compact disk read-only memory (CD-ROM), an optical storage device, a magnetic storage device, or any suitable combination thereof.

To provide the interaction with a user, the system and technology described herein may be applied on a computer having: a display device (e.g., a CRT (cathode ray tube) or LCD (liquid crystal display) monitor) for displaying information to the user; and a keyboard and a pointing device (e.g., a mouse or a trackball) through which the user can provide input to the computer. Other types of devices may also be used to provide the interaction with a user: for example, the feedback provided to the user may be any form of sensory feedback (e.g., visual feedback, auditory feedback, or tactile feedback); and input from the user may be received in any form (including acoustic input, voice input, or tactile input).

The system and technology described herein may be applied in a computing system that includes a background component (e.g., as a data server), or a computing system that includes a middleware component (e.g., an application server), or a computing system that includes a front-end component (e.g., a user computer having a graphical user interface or a web browser, wherein a user may interact with implementations of the system and technology described herein through the graphical user interface or the web browser), or a computing system that includes any combination of such background component, middleware component, or front-end component. The components of the system may be interconnected by any form or medium of digital data communication (e.g., a communication network). Examples of the communication network include: Local Area Networks (LAN), Wide Area Network (WAN), and the Internet.

A computer system may include a client and a server. The client and server are typically remote from each other and typically interact through a communication network. The relationship of the client and the server is generated by computer programs running on the respective computers and having a client-server relationship with each other.

It should be understood that the steps in the various processes described above may be reordered or omitted, or other steps may be added therein. For example, the steps described in the present disclosure may be performed in parallel or sequentially or may be performed in a different order, so long as the desired result of the technical solutions disclosed in the present disclosure can be achieved, and no limitation is made herein.

Above specific embodiments do not constitute a limitation on the protection scope of the present disclosure. It should be understood by those skilled in the art that various modifications, combinations, sub-combinations, and substitutions may be available according to design requirements and other factors. Any modifications, equivalent replacements and improvements made within the spirit and principle of the present disclosure shall be covered within the protection scope of the present disclosure.

What is claimed is:

1. An information processing method, implemented by circuits for implementing functions and applicable to a terminal, a server or any other processing equipment, comprising:
receiving a data acquisition task and an acquisition strategy issued by a cloud;
analyzing the acquisition strategy, to obtain priority information of acquired data for the data acquisition task; and taking the priority information as an importance degree identifier corresponding to the acquired data, and performing preferential transmission according to the importance degree identifier, comprising:
- triggering a data acquisition operation and transmitting the acquired data to the cloud in real time, in a case that the priority information is a first priority; or
- triggering the data acquisition operation, performing data screening on the acquired data through at least one of caching configuration, storage overwriting configuration, and cached data uploading configuration, and transmitting screened data to the cloud, in a case that the priority information is a non-first priority.

2. The information processing method of claim 1, wherein the priority information is obtained according to a data weight configured for the acquired data; and
the method further comprises:
- assigning values to the acquired data with different data weights respectively, to obtain the priority information describing different importance degrees.

3. The information processing method of claim 1, wherein triggering the data acquisition operation, performing the data screening on the acquired data through at least one of caching configuration, storage overwriting configuration and cached data uploading configuration, and transmitting the screened data to the cloud, in a case that the priority information is the non-first priority, comprises:
- triggering the data acquisition operation, caching first data locally, writing the first data into a local data storage area, and transmitting the first data to the cloud if a network condition is met, in a case that the priority information is a second priority;
- wherein the first data is stored in the local data storage area and cannot be overwritten by a second data before transmitted.

4. The information processing method of claim 3, wherein in a case that the acquired data in the local data storage area has different data weights, the method further comprises:
- triggering an operation of writing newly acquired data into the local data storage area; and
- overwriting, preferentially, data with a lowest data weight in a plurality of pieces of acquired data, or overwriting, preferentially, data with a largest time difference value in a plurality of pieces of acquired data, wherein the time difference value indicates a time difference between a moment when data is acquired and a current moment, in a case that data weights of the plurality of pieces of acquired data existing in the local data storage area are all smaller than a data weight of the newly acquired data;
- overwriting, preferentially, data with a largest time difference value in a plurality of pieces of acquired data, wherein the time difference value indicates a time difference between a moment when data is acquired and a current moment, in a case that data weights of the plurality of pieces of acquired data existing in the local data storage area are greater than or equal to a data weight of the newly acquired data; or
- discarding the newly acquired data, in a case that data weights of a plurality of pieces of acquired data existing in the local data storage area are all greater than a data weight of the newly acquired data.

5. The information processing method of claim 1, wherein triggering the data acquisition operation and performing the data screening on the acquired data through at least one of caching configuration, storage overwriting configuration and cached data uploading configuration, and transmitting the screened data to the cloud, in a case that the priority information is the non-first priority, further comprises:
- triggering the data acquisition operation, caching first data locally, writing the first data into a local data storage area, and transmitting the first data to the cloud if a network condition is met, in a case that the priority information is a third priority;
- wherein the first data can be overwritten by a second data during a time period after being written into the local data storage area and before transmitted, and a data weight of the second data is greater than a data weight configured for the first data.

6. The information processing method of claim 5, wherein in a case that the acquired data in the local data storage area has different data weights, the method further comprises:
- triggering an operation of writing newly acquired data into the local data storage area; and
- overwriting, preferentially, data with a lowest data weight in a plurality of pieces of acquired data, or overwriting, preferentially, data with a largest time difference value in a plurality of pieces of acquired data, wherein the time difference value indicates a time difference between a moment when data is acquired and a current moment, in a case that data weights of the plurality of pieces of acquired data existing in the local data storage area are all smaller than a data weight of the newly acquired data;
- overwriting, preferentially, data with a largest time difference value in a plurality of pieces of acquired data, wherein the time difference value indicates a time difference between a moment when data is acquired and a current moment, in a case that data weights of the plurality of pieces of acquired data existing in the local data storage area are greater than or equal to a data weight of the newly acquired data; or
- discarding the newly acquired data, in a case that data weights of a plurality of pieces of acquired data existing in the local data storage area are all greater than a data weight of the newly acquired data.

7. The information processing method of claim 1, wherein triggering the data acquisition operation and performing the data screening on the acquired data through at least one of caching configuration, storage overwriting configuration and cached data uploading configuration, and transmitting the screened data to the cloud, in a case that the priority information is the non-first priority, further comprises:
- triggering the data acquisition operation, caching first data locally, writing the first data into a local data storage area, and transmitting the first data to the cloud until a transmission of second data is completed, in a case that the priority information is a fourth priority;
- wherein a data weight of the second data is greater than a data weight configured for the first data.

8. The information processing method of claim 7, wherein in a case that the acquired data in the local data storage area has different data weights, the method further comprises:
- triggering an operation of writing newly acquired data into the local data storage area; and
- overwriting, preferentially, data with a lowest data weight in a plurality of pieces of acquired data, or overwriting, preferentially, data with a largest time difference value in a plurality of pieces of acquired data, wherein the time difference value indicates a time difference between a moment when data is acquired and a current moment, in a case that data weights of the plurality of pieces of acquired data existing in the local data storage area are all smaller than a data weight of the newly acquired data;

overwriting, preferentially, data with a largest time difference value in a plurality of pieces of acquired data, wherein the time difference value indicates a time difference between a moment when data is acquired and a current moment, in a case that data weights of the plurality of pieces of acquired data existing in the local data storage area are greater than or equal to a data weight of the newly acquired data; or discarding the newly acquired data, in a case that data weights of a plurality of pieces of acquired data existing in the local data storage area are all greater than a data weight of the newly acquired data.

9. An electronic device, implemented by circuits for implementing functions and applicable to a terminal, a server or any other processing equipment, comprising:

at least one processor; and a memory communicatively connected to the at least one processor; wherein, the memory stores instructions executable by the at least one processor, and the instructions are executed by the at least one processor to enable the at least one processor to:

receive a data acquisition task and an acquisition strategy issued by a cloud;

analyze the acquisition strategy, to obtain priority information of acquired data for the data acquisition task; and take the priority information as an importance degree identifier corresponding to the acquired data, and perform preferential transmission according to the importance degree identifier, wherein the instructions are executed by the at least one processor to enable the at least one processor further to:

trigger a data acquisition operation and transmit the acquired data to the cloud in real time, in a case that the priority information is a first priority; or trigger the data acquisition operation, perform data screening on the acquired data through at least one of caching configuration, storage overwriting configuration, and cached data uploading configuration, and transmit screened data to the cloud, in a case that the priority information is a non-first priority.

10. The electronic device of claim 9, wherein the priority information is obtained according to a data weight configured for the acquired data; and wherein the instructions are executed by the at least one processor to enable the at least one processor to:

assign values to the acquired data with different data weights respectively, to obtain the priority information describing different importance degrees.

11. The electronic device of claim 9, wherein the instructions are executed by the at least one processor to enable the at least one processor further to:

trigger the data acquisition operation, cache first data locally, write the first data into a local data storage area, and transmit the first data to the cloud if a network condition is met, in a case that the priority information is a second priority;

wherein the first data is stored in the local data storage area and cannot be overwritten by a second data before transmitted.

12. The electronic device of claim 11, wherein in a case that the acquired data in the local data storage area has different data weights, the instructions are executed by the at least one processor to enable the at least one processor to:

trigger an operation of writing newly acquired data into the local data storage area; and overwrite, preferentially, data with a lowest data weight in a plurality of pieces of acquired data, or overwrite, preferentially, data with a largest time difference value in a plurality of pieces of acquired data, wherein the time difference value indicates a time difference between a moment when data is acquired and a current moment, in a case that data weights of the plurality of pieces of acquired data existing in the local data storage area are all smaller than a data weight of the newly acquired data;

overwrite, preferentially, data with a largest time difference value in a plurality of pieces of acquired data, wherein the time difference value indicates a time difference between a moment when data is acquired and a current moment, in a case that data weights of the plurality of pieces of acquired data existing in the local data storage area are greater than or equal to a data weight of the newly acquired data; or discard the newly acquired data, in a case that data weights of a plurality of pieces of acquired data existing in the local data storage area are all greater than a data weight of the newly acquired data.

13. The electronic device of claim 9, wherein the instructions are executed by the at least one processor to enable the at least one processor further to:

trigger the data acquisition operation, cache first data locally, write the first data into a local data storage area, and transmit the first data to the cloud if a network condition is met, in a case that the priority information is a third priority;

wherein the first data can be overwritten by a second data during a time period after being written into the local data storage area and before transmitted, and a data weight of the second data is greater than a data weight configured for the first data.

14. The electronic device of claim 13, wherein in a case that the acquired data in the local data storage area has different data weights, the instructions are executed by the at least one processor to enable the at least one processor to:

trigger an operation of writing newly acquired data into the local data storage area; and overwrite, preferentially, data with a lowest data weight in a plurality of pieces of acquired data, or overwrite, preferentially, data with a largest time difference value in a plurality of pieces of acquired data, wherein the time difference value indicates a time difference between a moment when data is acquired and a current moment, in a case that data weights of the plurality of pieces of acquired data existing in the local data storage area are all smaller than a data weight of the newly acquired data;

overwrite, preferentially, data with a largest time difference value in a plurality of pieces of acquired data, wherein the time difference value indicates a time difference between a moment when data is acquired and a current moment, in a case that data weights of the plurality of pieces of acquired data existing in the local data storage area are greater than or equal to a data weight of the newly acquired data; or discard the newly acquired data, in a case that data weights of a plurality of pieces of acquired data existing in the local data storage area are all greater than a data weight of the newly acquired data.

15. The electronic device of claim 9, wherein the instructions are executed by the at least one processor to enable the at least one processor further to:
- trigger the data acquisition operation, cache first data locally, write the first data into a local data storage area, and transmit the first data to the cloud until a transmission of second data is completed, in a case that the priority information is a fourth priority;
- wherein a data weight of the second data is greater than a data weight configured for the first data.

16. The electronic device of claim 15, wherein in a case that the acquired data in the local data storage area has different data weights, the instructions are executed by the at least one processor to enable the at least one processor to:
- trigger an operation of writing newly acquired data into the local data storage area; and
- overwrite, preferentially, data with a lowest data weight in a plurality of pieces of acquired data, or overwrite, preferentially, data with a largest time difference value in a plurality of pieces of acquired data, wherein the time difference value indicates a time difference between a moment when data is acquired and a current moment, in a case that data weights of the plurality of pieces of acquired data existing in the local data storage area are all smaller than a data weight of the newly acquired data;
- overwrite, preferentially, data with a largest time difference value in a plurality of pieces of acquired data, wherein the time difference value indicates a time difference between a moment when data is acquired and a current moment, in a case that data weights of the plurality of pieces of acquired data existing in the local data storage area are greater than or equal to a data weight of the newly acquired data; or
- discard the newly acquired data, in a case that data weights of a plurality of pieces of acquired data existing in the local data storage area are all greater than a data weight of the newly acquired data.

17. A non-transitory computer-readable storage medium, implemented by circuits for implementing functions and applicable to a terminal, a server or any other processing equipment, storing computer instructions, wherein the computer instructions, when executed by a computer, cause the computer to:
- receive a data acquisition task and an acquisition strategy issued by a cloud;
- analyze the acquisition strategy, to obtain priority information of acquired data for the data acquisition task; and
- take the priority information as an importance degree identifier corresponding to the acquired data, and perform preferential transmission according to the importance degree identifier, wherein the computer instructions, when executed by the computer, cause the computer further to:
- trigger a data acquisition operation and transmit the acquired data to the cloud in real time, in a case that the priority information is a first priority; or
- trigger the data acquisition operation, perform data screening on the acquired data through at least one of caching configuration, storage overwriting configuration, and cached data uploading configuration, and transmit screened data to the cloud, in a case that the priority information is a non-first priority.

18. The non-transitory computer-readable storage medium of claim 17, wherein the priority information is obtained according to a data weight configured for the acquired data; and
- wherein the computer instructions, when executed by the computer, cause the computer to:
- assign values to the acquired data with different data weights respectively, to obtain the priority information describing different importance degrees.

* * * * *